US009952847B1

(12) United States Patent
Comer

(10) Patent No.: US 9,952,847 B1
(45) Date of Patent: Apr. 24, 2018

(54) PROCESS FOR USER-REQUESTED ACQUISITION OF REMOTE CONTENT

(71) Applicant: Charles E. Comer, Raleigh, NC (US)

(72) Inventor: Charles E. Comer, Raleigh, NC (US)

( * ) Notice: Subject to any disclaimer, the term of this patent is extended or adjusted under 35 U.S.C. 154(b) by 0 days.

(21) Appl. No.: 14/717,037

(22) Filed: May 20, 2015

Related U.S. Application Data

(60) Provisional application No. 62/000,765, filed on May 20, 2014.

(51) Int. Cl.
G06F 8/61 (2018.01)
H04L 29/08 (2006.01)
G06F 9/445 (2018.01)

(52) U.S. Cl.
CPC ............... *G06F 8/61* (2013.01); *H04L 67/10* (2013.01)

(58) Field of Classification Search
CPC .................................. G06F 8/61; H04L 67/10
See application file for complete search history.

(56) References Cited

U.S. PATENT DOCUMENTS

| 6,871,780 | B2 | 3/2005 | Nygren et al. |
| 7,805,530 | B2 | 9/2010 | Yamaguchi |
| 8,284,061 | B1 | 10/2012 | Dione |
| 8,353,447 | B2 | 1/2013 | Yach |
| 8,413,882 | B1 | 4/2013 | Nidamarthi et al. |
| 8,503,791 | B2 | 8/2013 | Conwell |
| 8,532,299 | B2 | 9/2013 | Hara |
| 8,533,015 | B2 | 9/2013 | Meegan |
| 8,626,859 | B2 | 1/2014 | Davis |
| 9,077,828 | B1* | 7/2015 | Koster ................. H04M 3/5231 |
| 2008/0142599 | A1* | 6/2008 | Benillouche ........... G07G 3/006 235/462.41 |
| 2011/0314438 | A1* | 12/2011 | Surazski ............. G06F 11/0742 717/100 |
| 2012/0137270 | A1* | 5/2012 | Ortiz ..................... G06F 9/4446 717/106 |
| 2012/0276880 | A1* | 11/2012 | Angorn ................... H04W 4/12 455/414.1 |

(Continued)

OTHER PUBLICATIONS

QR-Barcode Reader & Encoder. Product Listing [online]. Ullah, MD, 2013 [retrieved on [Feb. 12, 2014]. Retrieved from the Internet: http://webcache.googleusercontent.com/search?q=cache:HNgEEGeHUVkJ:https://itunes.apple.com/us/app/qr-barcode-reader-encoder/id702177988%3Fmt%3D8+&cd=2&hl=en&ct=clnk&gl=us.

(Continued)

*Primary Examiner* — Suezu Ellis
(74) *Attorney, Agent, or Firm* — Aaron R. Cramer; Cramer Patent & Design, PLLC

(57) ABSTRACT

A mobile device application process utilizing both proprietary and common Quick Response (QR)™ coding. Upon scanning with a common scanner, the user is offered to install a proprietary scanner from the application store applicable to their device. Upon scanning a proprietary QR™ code with the proprietary scanner, data is sent to the backend engine and customized feedback is prepared and sent to both the QR™ code owner and the end user. Many options are also offered such as the proprietary scanner's capability of scanning common QR™ codes and sending notification just to the user. These notifications can boast the QR™ code owner's business presence as well as advertisements and other functions.

3 Claims, 1 Drawing Sheet

(56) References Cited

U.S. PATENT DOCUMENTS

| | | | | |
|---|---|---|---|---|
| 2013/0043302 | A1* | 2/2013 | Powlen | G06Q 50/01 |
| | | | | 235/375 |
| 2013/0200145 | A1* | 8/2013 | Cameron | G06F 17/30002 |
| | | | | 235/375 |
| 2013/0278622 | A1* | 10/2013 | Sun | G06Q 20/22 |
| | | | | 345/589 |
| 2015/0189461 | A1* | 7/2015 | Pang | H04W 4/008 |
| | | | | 455/41.1 |
| 2015/0213203 | A1* | 7/2015 | Cumbie | G06F 19/323 |
| | | | | 705/3 |
| 2015/0213434 | A1* | 7/2015 | Fletcher | G06Q 20/20 |
| | | | | 705/14.27 |
| 2016/0078333 | A1* | 3/2016 | Simske | G06K 1/123 |
| | | | | 235/462.04 |
| 2016/0098690 | A1* | 4/2016 | Silva | G06Q 10/30 |
| | | | | 705/21 |
| 2016/0253732 | A1* | 9/2016 | Brown | G06Q 10/00 |
| | | | | 235/462.11 |

OTHER PUBLICATIONS

Chuang, Jun-Chou; Hu, Yu-Chen and Ko, Hsien-Ju. 'A Novel Secret Sharing Technique Using QR Code,' International Journal of Image Processing (IJAP), vol. (4): Issue (5), pp. 468-475. Journal Article [online]. IJAP, 2009. [retrieved on Feb. 12, 2014]. Retrieved from the Internet: http://www.cscjournals.org/csc/manuscript/Journals/IJIP/volume4/Issue5/IJIP-263.pdf.

* cited by examiner

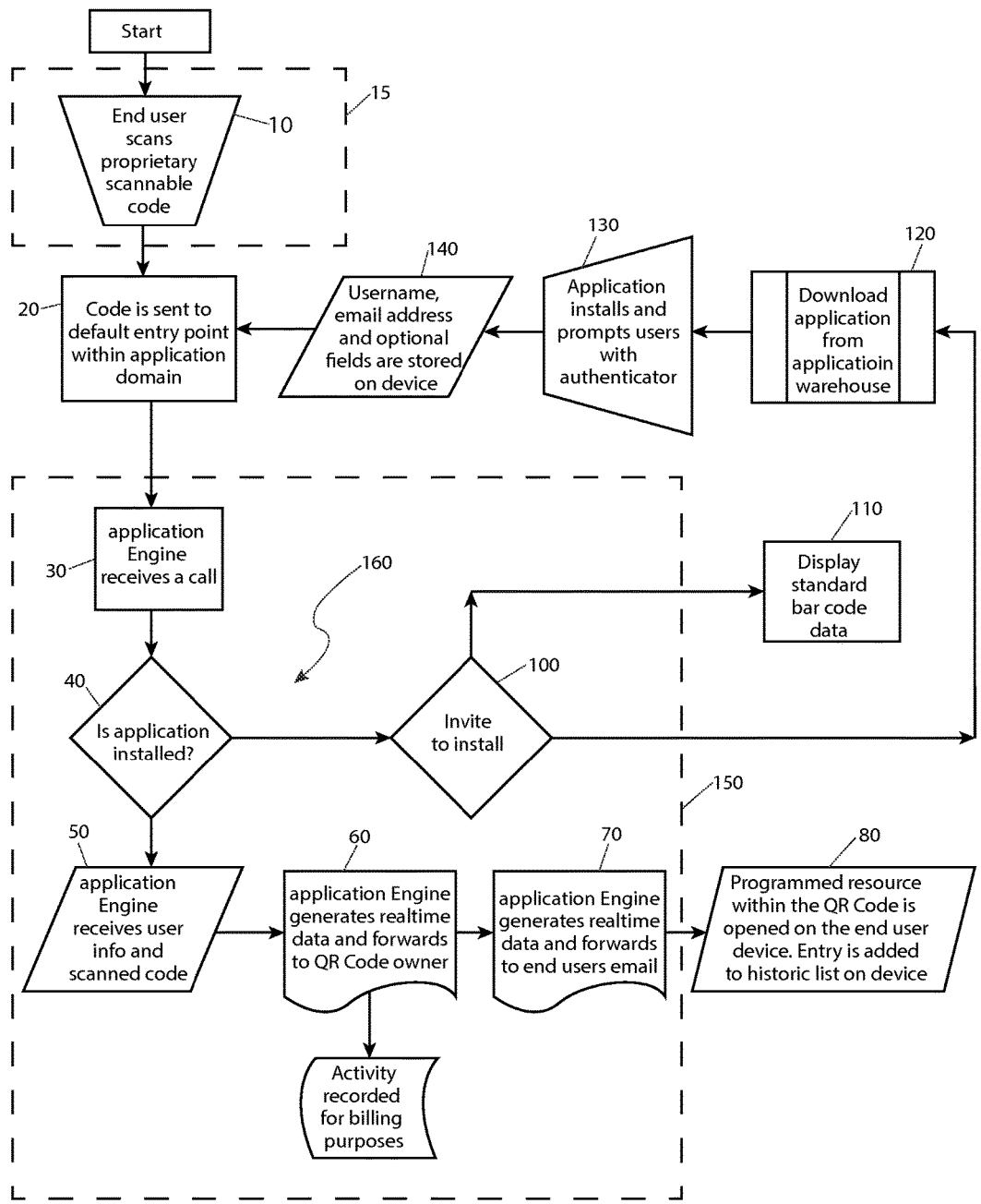

PROCESS FOR USER-REQUESTED ACQUISITION OF REMOTE CONTENT

RELATED APPLICATIONS

The present invention is a continuation in part of, was first described in, and claims the benefit of U.S. Provisional Application No. 62/000,765, filed May 20, 2014, the entire disclosure of which is incorporated herein by reference.

FIELD OF THE INVENTION

The present invention relates to a mobile device application process utilizing both proprietary and common Quick Response (QR)™ coding.

BACKGROUND OF THE INVENTION

Coding is commonly associated with advertising and commercial products. Such coding is typically located on packaging or on the product itself, or can be embedded or imprinted on the advertising or in such a way as to enable visual sensing of the code.

Common types of codes in today's age typically relies on a proprietary or individual type of two-dimensional code that can be easily read by a reader, typically hand-held or portable. UPC barcode readers and QR codes are such types of coding. These codes are very useful in today's society where practically everyone carries a mobile telephone or smart phone with memory capable of storing a reader. QR codes are particularly useful for storing information like a URL address that can be accessed by the same smartphone having the reader software. The URL address is typically associated with the product or advertisement product, which can prompt or offer more content to be downloaded later directly onto the smartphone that carries the reader itself. Such information is useful for immediately, or later during off-peak time.

Further, having proprietary coding either associated with the normal coding or provided as a separate independent code can provide selective, customary, or exclusive content. Having proprietary information only available to a select few customers who opt into a proprietary "club" or "association" to provide the above mentioned exclusive content can also generate business or traffic to a URL.

SUMMARY OF THE INVENTION

It is therefore an object of the present invention to provide a process where a portable device, such as a common scanner or smartphone with a code reader application operable on it, scans a code associated with a product, advertising, or other similar system, to download content from a remote domain associated with said coding. During the scanning process, the user is offered to install a proprietary code reader from the application store applicable to their device. Upon scanning a proprietary code with the proprietary code reader, proprietary content is sent to the backend engine and customized feedback is prepared and sent to both the code owner and the end user. Many options are also offered such as the proprietary code reader's capability of scanning common codes and sending notification just to the user. These notifications can boast the code owner's business presence as well as advertisements and other functions.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a process flow diagram of a QR code application process 10, according to a preferred embodiment of the present invention.

DESCRIPTIVE KEY

- 10 scanning step
- 15 mobile device
- 20 data storage step
- 30 call engine domain step
- 40 query engine domain step
- 50 data transfer to engine domain step
- 60 data transfer to code owner step
- 70 data transfer to end user step
- 80 engine generated device display
- 100 install application decision step
- 110 standard device display
- 120 download application step
- 130 prompt user data step
- 140 user data storage step
- 150 remote domain
- 160 remote domain application engine

DETAILED DESCRIPTION OF THE PREFERRED EMBODIMENT

The best mode for carrying out the invention is presented in terms of its preferred embodiment, herein depicted within FIG. 1. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a QR code application process (herein described as the "process") 10, which provides a process whereby a proprietary QR code reader application may be downloaded to a mobile device 15, enabling it to read and utilize proprietary QR coding placed upon a product by a code owner (commercial customer). The proprietary QR coding is then graphically reproduced and distributed by a remote application engine domain 150 for viewing by the general public. Proprietary coding describes coding that is only capable of being accessed by a proprietary code reader and not to the general public.

Referring now to FIG. 1, a process flow diagram of the process 10, according to the preferred embodiment of the present invention, is disclosed. The process 10 begins as an end user scans a proprietary QR coding 10. The scanning of the proprietary code sends a call at the data storage step 20 from the end user's device 15 to the remote domain 150. At the call engine domain step 30, the remote domain application engine 160 is then queried as to whether or not the mobile device 15 has previously downloaded the application software at the query engine domain step 40. If the mobile device 15 has never downloaded the application, the remote domain application engine 160 prompts the end user to download the application at the install application decision step 100. If agreed upon, the application is downloaded from an application warehouse at the download application step 120; the end user is prompted for personal information at the prompt user data step 130; the end user enters the information at the prompt user data step 130; and, the information is delivered and stored within a database portion within the remote domain application engine 160 at the data transfer to engine domain step 50. In an event that the end user declines to download the application, a standard QR code data display 110 is initiated upon the mobile device 15.

Coding is sent to the default entry point of the remote domain application engine 160 which then transfers the data to the code owner at step 60; provides an engine generated display 80 upon the mobile device 15; and, generates an email to the end user at the end user step 70 containing information such as, but not limited to: scanning event data such as time and location, advertising information, related web links, and the like.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A method for displaying content gleaned from coding, comprising the steps of:
   (a) providing a communication device having a code reader operable thereon;
   (b) scanning proprietary Quick Response (QR) coding having standard QR code data with said code reader;
   (c) communicating with a remote domain application engine associated with said coding;
   (d) determining from said communication with the remote domain application engine if said communication device has a proprietary code reader;
      (d1) if a proprietary code reader is not installed then prompting an end user of said communication device to download and install a proprietary code reader and then delivering that proprietary code reader to said communication device if the end user agrees;
      (d2) if it is determined that a proprietary code reader is installed then delivering proprietary content to said communication device;
      (d3) if a proprietary code reader was installed in step (d1) then delivering proprietary content to said communication device;
      (d4) sending standard QR code data to the communication device if a proprietary code reader was not installed and had not been installed in step (d1); and,
      (d5) transferring data to a code owner if said communication device has an operating proprietary code reader.

2. The method of claim 1, wherein in step (d1) said proprietary code reader is downloaded from an application warehouse.

3. The method of claim 1, wherein in step (d1) the end user is prompted for personal information which is stored within the remote domain application engine.

* * * * *